(12) United States Patent
Kikuchi et al.

(10) Patent No.: US 9,410,566 B2
(45) Date of Patent: Aug. 9, 2016

(54) FIXING DEVICE FOR PANEL

(75) Inventors: Takeyasu Kikuchi, Tokyo (JP);
Masatomo Sato, Miyagi (JP); Seiichi Fukawa, Tokyo (JP)

(73) Assignee: WPC CORPORATION, Tokyo (JP)

( * ) Notice: Subject to any disclaimer, the term of this patent is extended or adjusted under 35 U.S.C. 154(b) by 326 days.

(21) Appl. No.: 14/130,088

(22) PCT Filed: Jun. 28, 2012

(86) PCT No.: PCT/JP2012/066590
§ 371 (c)(1),
(2), (4) Date: Mar. 6, 2014

(87) PCT Pub. No.: WO2013/005648
PCT Pub. Date: Jan. 10, 2013

(65) Prior Publication Data
US 2014/0199117 A1    Jul. 17, 2014

(30) Foreign Application Priority Data
Jul. 1, 2011    (JP) .................................. 2011-147280

(51) Int. Cl.
*E04F 13/08*  (2006.01)
*F16B 5/00*  (2006.01)
*E04F 13/14*  (2006.01)
*F16B 5/06*  (2006.01)

(52) U.S. Cl.
CPC ........... *F16B 5/0004* (2013.01); *E04F 13/0846* (2013.01); *E04F 13/14* (2013.01); *F16B 5/0016* (2013.01); *E04F 2203/04* (2013.01); *F16B2005/0678* (2013.01); *Y10T 403/50* (2015.01); *Y10T 403/66* (2015.01); *Y10T 403/7092* (2015.01)

(58) Field of Classification Search
CPC ... E04F 13/0826; E04F 13/0846; E04F 13/14; E04F 2203/04; F16B 5/0004; F16B 5/0008; F16B 5/0012; F16B 5/0016; F16B 5/002; F16B 5/0607; F16B 5/121; F16B 5/123; F16B 5/125; F16B 2005/0678; Y10T 403/4318; Y10T 403/50; Y10T 403/57; Y10T 403/5706; Y10T 403/66; Y10T 403/7021; Y10T 403/7092; Y10T 403/7094
USPC ......... 403/208, 286, 300, 301, 341, 356, 380, 403/381; 52/506.09, 506.1
See application file for complete search history.

(56) References Cited

U.S. PATENT DOCUMENTS

| | | | |
|---|---|---|---|
| 7,594,368 B2 * | 9/2009 | Kurz ................... | E04F 19/0468 24/289 |
| 8,979,052 B2 * | 3/2015 | Uota ................... | E04F 13/0846 403/381 |
| 2006/0272261 A1 | 12/2006 | Ito | |

FOREIGN PATENT DOCUMENTS

| | | | | |
|---|---|---|---|---|
| EP | 2447440 A1 * | 5/2012 | .......... | E04F 13/0846 |
| FR | 2684418 A1 | 6/1993 | | |

(Continued)

*Primary Examiner* — Josh Skroupa
(74) *Attorney, Agent, or Firm* — Cooper Legal Group LLC

(57) ABSTRACT

A fixing device for a panel which can absorb a dimensional change due to expansion of the siding board is provided. A comb-shaped slit is formed at an area from the intermediate line C defined between opposed two sides of a rectangular metal plate to form leaf spring-shaped strip plates 41, 42 and 43. The strip plates are bent at the intermediate line C and a bend line F to form fixing pieces 41a, 42a and 43a and lock pieces 41b, 42b, and 43b so as to lock fixing ends 51a and 52b of the siding board 50. Moreover, an inclined angle θ1 of the fixing piece 41a disposed at the strip plate 41 is formed to have a different angle from an inclined angle θ2 of the fixing pieces 42a, 43a disposed at the remaining strip plates 42 and 43. Thereby the strip plates can be elastically deformed.

10 Claims, 17 Drawing Sheets

(56) References Cited

FOREIGN PATENT DOCUMENTS

| JP | H03-12902 | 3/1991 | | |
| JP | H05-42468 | 6/1993 | | |
| JP | 2004-211526 | 7/2004 | | |
| JP | 2005-220577 | 8/2005 | | |
| JP | 2006-104742 | 4/2006 | | |
| JP | 2006-265864 | 10/2006 | | |
| WO | WO 2011040515 A1 * | 4/2011 | .......... | E04F 13/0846 |

* cited by examiner

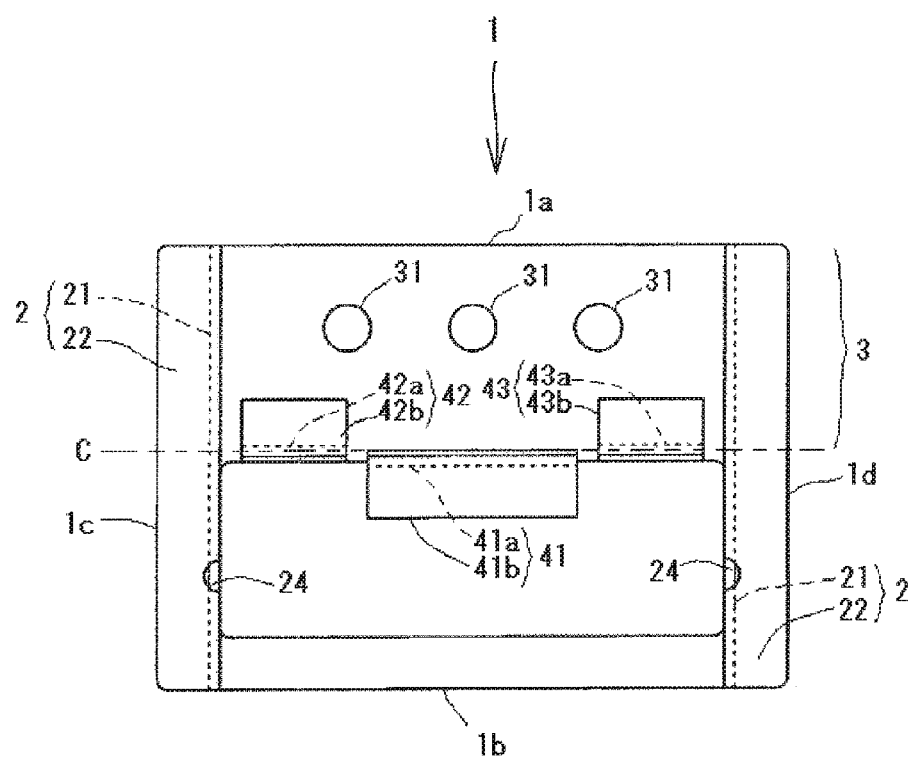

FIXING DEVICE FOR PANEL

FIELD OF THE INVENTION

The present invention relates to a fixing device for a panel, for example, a siding panel.

DESCRIPTION OF THE RELATED ART

The construction of exterior walls using factory-facility manufactured siding panels has become widespread recently because the siding panels allow constructing exterior walls in comparatively short work periods with consistent quality. These siding panels include a cement-based siding panel where a cement raw material into which fibers are mixed is molded to yield an appearance of tiles or an atmosphere of stone masonry, or a metal-based siding panel formed by combining a board material made of a metal such as iron or aluminum with a heat-insulating material made of, for example, foamed resin.

FIG. 9 illustrates an exemplary conventional fixing device used for installing the siding panel to a wall body W.

A fixing device 101 illustrated in FIG. 9, which is a metal plate bent to a predetermined shape and fixed to the wall body W via a nail hole 131 with, for example, a screw nail, so as to lock an end portion of a siding board 150. In the fixing device 101 illustrated in FIG. 9, two slits are made upward from the bottom edge of the fixing device 101 in a position at about the lower sixth (as shown on the drawing) of in a rectangular-shaped metal plate of the fixing device 101. The metal plate between the slits is bent to an approximately right angle, thus a fixing piece 140 is formed. Then, two slits are made into a distal edge portion of this fixing piece 140, trisecting it. The center and the right and left of the trisected distal end portions are bent in the upside-down direction, respectively. This forms lock pieces 141 and 142 vertically projecting from the end edge on the projecting side of the fixing piece 140 (See FIG. 4 of Patent Document 1).

Meanwhile, as illustrated in the example of FIGS. 10A and 10B, the siding board 150 includes a lower fixing end 151 and an upper fixing end 152 at the end portions, which are the end portions in the vertical direction on the drawing. The lower fixing end 151 is locked with the above-described fixing piece 140 and the center lock piece 141 of the fixing device 101. The upper fixing end 152 is locked with the fixing piece 140 and right and left lock pieces 142 and 142. As illustrated in FIG. 10 FIGS. 10A and 10B, the upper fixing end 152 at the lower siding board 150 and the lower fixing end 151 at the upper siding board 150 are butted against each other via the fixing piece 140. Accordingly, the upper and the lower siding boards 150 and 150 can be fixed simultaneously.

In the above-described description, an example of locking and fixing the upper and lower ends of the siding boards 150 with the fixing device 101 is described. However, instead of the configuration, there may be a case where fixing ends locked with the fixing device 101 are disposed at the right and left sides of the siding boards 150 and the siding boards neighboring in the lateral direction are fixed.

DOCUMENT OF RELATED ART

Patent Documents

Patent Document 1: Japanese Unexamined Patent Application Publication No. 2006-104742

DISCLOSURE OF THE INVENTION

Problem to be Solved by the Invention

In the conventional fixing device 101 described above, the upper fixing end 152 of the lower siding board 150 and the lower fixing end 151 of the upper siding board 150 are both locked by being butted against the common fixing piece 140.

Accordingly, the upper and lower ends of each siding board 150 have no looseness at the positions and immovably fixed. However, the siding board 150 expands as the external temperature rises. This causes a mismatch in dimensions between a space between the fixing pieces 140 of the fixing devices 101 and 101 disposed on the upper and lower sides and the length between the lower fixing end 151 and the upper fixing end 152 of the siding board 150.

In particular, assume that synthetic wood whose main constituent is fractured wood and resin and dimensional change due to heat is large compared with the above-described cement-based and metal-based siding boards, as an example, the siding board manufactured by recycled wood obtained using powder of scrap wood from natural wood and waste plastic as a raw material, is used as the siding board 150. Even if the siding board 150 is appropriately installed at the beginning of the construction as illustrated in (A) in FIG. 11, expansion of the siding board 150 warps the siding boards 150 itself as illustrated in (B) in FIG. 11 and the exterior wall surface of the built part twists, thus causing a poor appearance.

At last, such warping causes a damage, deformation, and drop of interior and exterior materials, which are the siding boards themselves in this case, also resulting in a damage and a drop of the fixing device. Further, the warping causes a damage and a drop of a caulking material applied on a masonry joint between the siding boards 150, resulting in degrade of waterproof performance of the wall surface.

Meanwhile, preliminarily accommodating thermal expansion of the siding board 150, providing a slight clearance at the fixing device 101 between the upper fixing end 152 of the siding board 150 and the fixing piece 140 of the fixing device 101 gives a looseness at the siding boards 150 between the fixing devices 101. This causes rattling at the siding boards 150, generating a risk of damage and drop. The change in the width of the masonry joint in accordance with the rattling also may cause, for example, a drop of the caulking material.

The present invention has been made to solve the drawbacks caused by the related art. One of its objectives is to provide a fixing device for a panel such as a siding board with comparatively simple configuration that allows construction with the method similar to the method for the conventional fixing device and prevents warping and deformation of the siding board by absorbing a dimensional change due to expansion of the siding board.

In the above-described description of the background technique and the embodiments described below, assuming, thermal expansion due to climatic change, which is the problem, the siding panel as an exterior material is described. However, the present invention is not limited to this. It is obvious that the present invention is applicable to a panel as interior and exterior materials made of various materials, for example, a board material made of the synthetic wood or a board material made of the synthetic wood constructed as an outdoor deck (referred to as a "panel" in this description).

Means for Solving the Problems

Means for solving the problems will be described below using reference numerals used in embodiments of the invention. It is to be noted that these reference numerals are only provided for clarifying the correspondence relationship between the scope of the claims and the embodiments of the invention, but should not be used for limiting the interpretation of the technical scope of the claims of the present invention.

In order to achieve the above objectives, a fixing device 1 for a panel according to the present invention, comprising:

a rectangular metal plate with opposed two sides 1a, 1b, an intermediate line C (see FIG. 1 and FIG. 4A) being defined parallel to the two sides 1a, 1b between the two sides 1a, 1b, a main body portion 3 being formed an area from the intermediate line C to one side 1a of the two sides 1a, 1b, a slit (in the example of FIG. 4A, a slit Sh and four (4) slits Sv1 to Sv4, which form a comb-shaped slit as a whole) being formed at an area from the intermediate line C to the other side 1b among the two sides 1a, 1b, a plurality of pieces of leaf spring-shaped strip plates 41, 42 and 43 being formed continuous with the main body portion 3 at the intermediate line C, the plurality of pieces of leaf spring-shaped strip plates 41, 42 and 43 being formed orthogonal to the two sides 1a, 1b; and a nail hole 31 disposed at the main body portion 3 for fixing to a wall body W in the embodiment which is a constructed object, for example, an inner wall, an outer wall, and as a floor member, a supporting member such as a beam, wherein all the strip plates 41, 42 and 43 are bent at the intermediate line C to a same direction with respect to the main body portion 3, at least one (strip plate 41) of the plurality of pieces of the strip plates 41, 42 and 43 is bent to a predetermined direction at a bend position (bend line F in FIG. 4A) parallel to and away from the intermediate line C at a predetermined distance, remaining strip plates 42, 43 are bent to a direction opposite from the predetermined direction, areas from the intermediate line C of each strip plate 41, 42 and 43 to the bend position (bend line F) are fixing pieces 41a, 42a and 43a, areas from the bend position (bend line F) to a distal end are lock pieces 41b, 42b, and 43b and a first inclined angle θ1 (see FIG. 2B) of the fixing piece 41a disposed at the strip plate 41 on which the lock piece 41b is bent to a predetermined direction is formed to have a different angle from a second inclined angle θ2 (see FIG. 2B) of the fixing pieces 42a, 43a disposed at the remaining strip plates 42 and 43.

In the fixing device 1 for a panel according to the above configuration, in the embodiment, a subject to be fixed may be a panel comprising a siding board 50 made of synthetic wood manufactured by extrusion molding, and the fixing device 1 may be used for fixing both end portions in a direction orthogonal to an extrusion direction of the siding board 50.

Furthermore, spacers 2, 2 may be formed by bending along other two sides 1c, 1d orthogonal to the two sides 1a, 1b of the metal plates at a predetermined width and in a same direction, and the three (3) pieces of strip plates 41, 42 and 43 may be formed between the spacers 2, 2.

In the fixing device 1 according to the above configuration, the spacers 2, 2 may include a sidewall 21 which is orthogonal to the main body portion 3, and a flange 22 projecting outward from the sidewall 21 and being parallel to the main body portion 3.

Furthermore, a cutout aperture 24 or a through-hole may be disposed in the spacers 2, 2 at each part positioned outside of the main body portion 3 (lower part with respect to the intermediate line C in FIG. 1).

Effect of the Invention

According to the above-described configurations, a fixing device 1 for a panel of the present invention obtains the following remarkable effects.

The three pieces of leaf spring-shaped strip plates 41, 42, and 43 were bent, and fixing pieces 41a, 42a, and 43a and lock pieces 41b, 42b, and 43b were formed at the respective strip plates 41, 42, and 43. Also, an inclined angle θ1, which was an angle of the center fixing piece 41a with respect to a main body portion 3, and an inclined angle θ2, which was an angle of the fixing pieces 42a and 43a on both sides, were set to a different angle. Accordingly, even if a siding board 50 was expanded, each fixing piece 41a, 42a, and 43a was elastically deformed to the extent that the inclined angle θ1 of the center fixing piece 41a and the inclined angle θ2 of the other fixing pieces 42a and 43a became the same angle, thus absorbing the dimensional change of the siding board 50 due to expansion.

In particular, in the case where the fixing devices 1 are utilized for a panel formed of a siding board 50 made of synthetic wood manufactured by extrusion molding, in which the fixing devices 1 are employed for fixing between end portions of the siding boards 50 in a direction orthogonal to the extrusion direction where dimensions are restricted, even though the subject to be fixed are the siding boards 50 made of synthetic wood, which swell as a consequence of comparatively large dimensional changes due to changes in temperature, dimensional changes in the siding boards 50 due to heat can be sufficiently absorbed. Additionally, warping, deformation, or similar failure of the panel formed of the siding boards were able to be preferably prevented.

In the configuration where the above-described spacers 2 and 2 are formed along other two sides 1c and 1d of the fixing device 1, the strength of the fixing device 1 can be enhanced while keeping the above-described function of absorbing the dimensional change in the siding board 50. Moreover, the siding board 50 was able to be installed away from the wall body W, which is the constructed object, by the width of the spacers 2 and 2.

As a result, even if rain water or similar object gets through between the siding board 50 and the wall body W, the clearance between both facilitates discharging the water. When air passes through in the clearance, the inside of the clearance between the siding board 50 and the wall body W is dried, thus preferably preventing, for example, generation of a mold and erosion.

By forming the above-described spacer 2 with a sidewall 21 and a flange 22, the strength of the fixing device 1 can be further improved. By contacting the back surface of the siding boards 50 to the flange 22, stability of the siding board 50 in installation was able to be improved.

Further, the cutout aperture 24 or a through-hole is disposed at a part positioned outside of the main body portion 3 of the spacers 2 and 2 (part lower than an intermediate line C shown on FIG. 1). This allows the spacer to be easily cut starting from the cutout aperture 24 or the through-hole part in the case where, for example, the dimension of the fixing device needs to be adjusted.

BRIEF DESCRIPTION OF THE DRAWINGS

FIG. 1 is a front view of a fixing device according to one embodiment of the present invention;

In FIG. 4A, (A) and (a) illustrate a state where slits are disposed and strip plates 41 to 43 are formed. In FIG. 4B, (B) and (b) illustrate a state where the strip plates 41 to 43 are bent at an intermediate line C. In FIG. 4C, C and (c) illustrate a state where lock pieces 41b, 42b, and 43b of the strip plates 41, 42, and 43 are bent at a bend line F;

FIG. 7A illustrates a state immediately after construction. FIG. 7B illustrates a state of starting expansion of the siding boards. FIG. 7C illustrates a state of the fixing device being deformed to the maximum extent;

BEST MODE FOR CARRYING OUT THE INVENTION

Preferred embodiments of the present invention will be described below by referring to the accompanying drawings.
(Fixing Device)

Figure 2A:
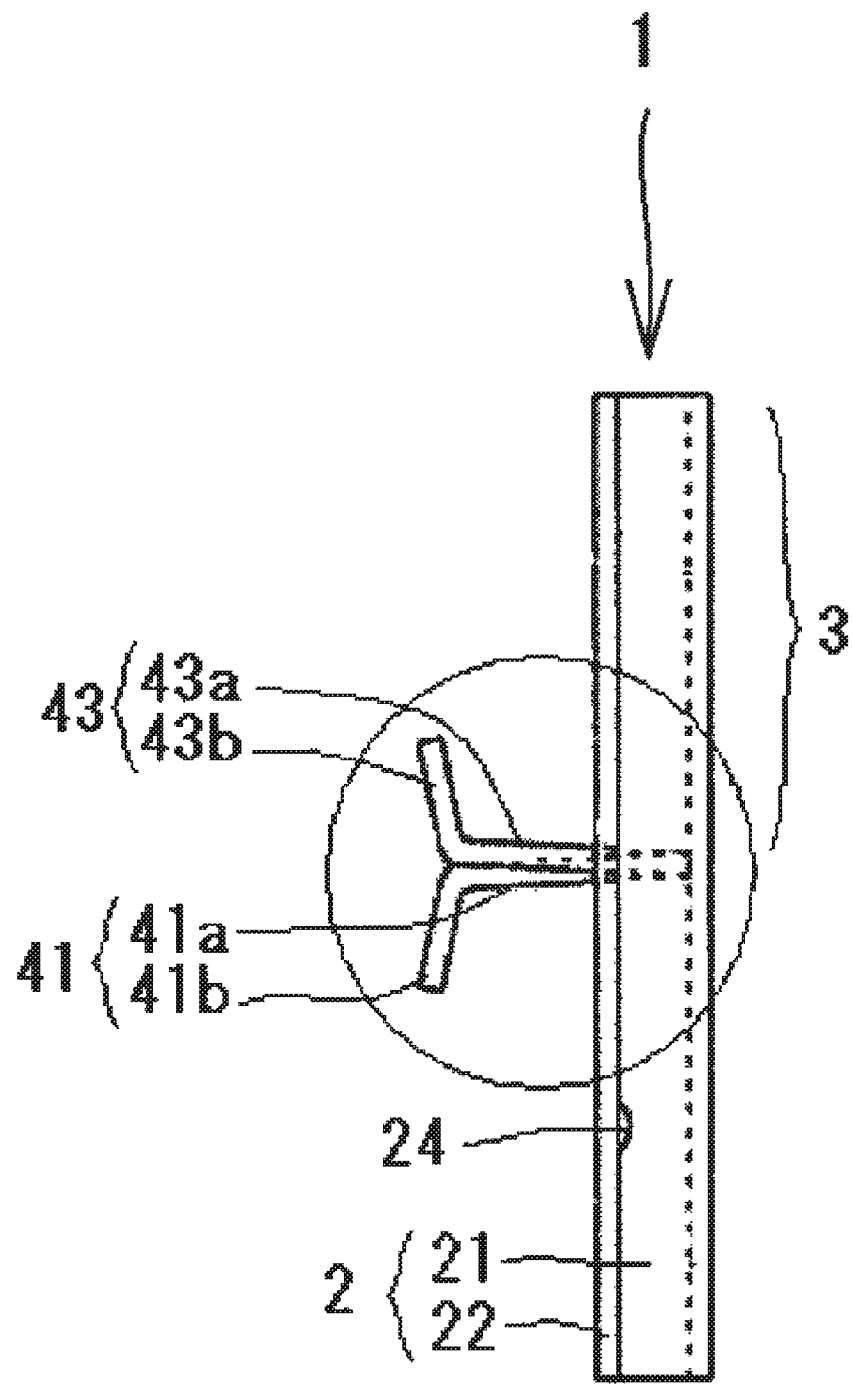
FIG. 2A is a left side view of the fixing device according to one embodiment of the present invention.
Figure 2B:
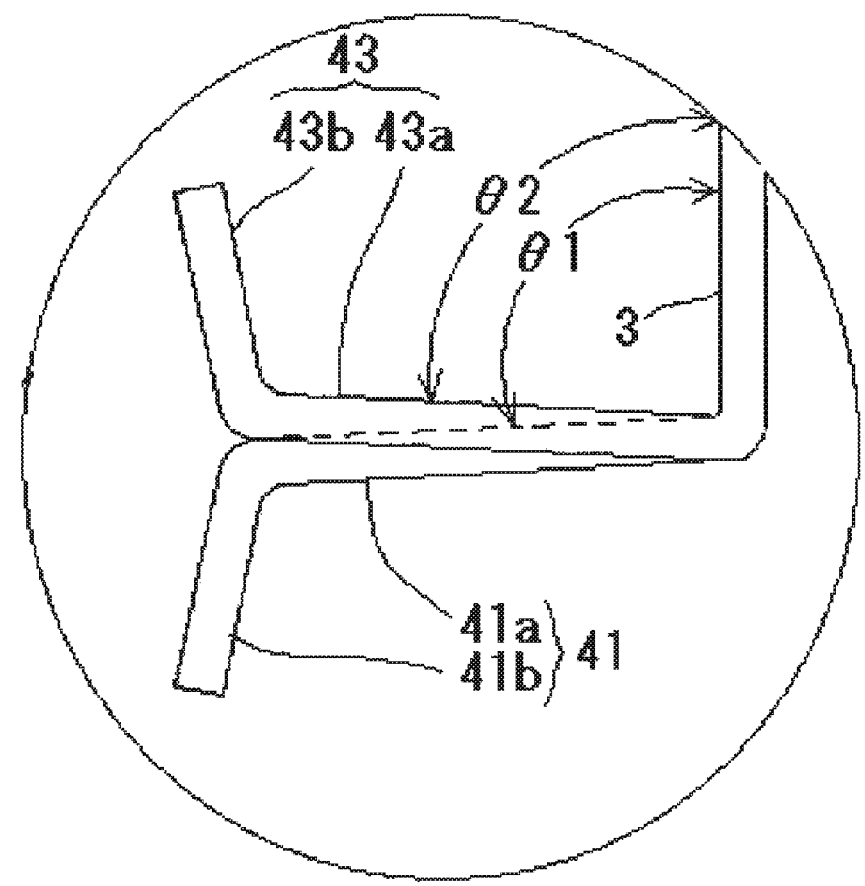
FIG. 2B is an enlarged view of a portion circled in FIG. 2A.
Figure 3:
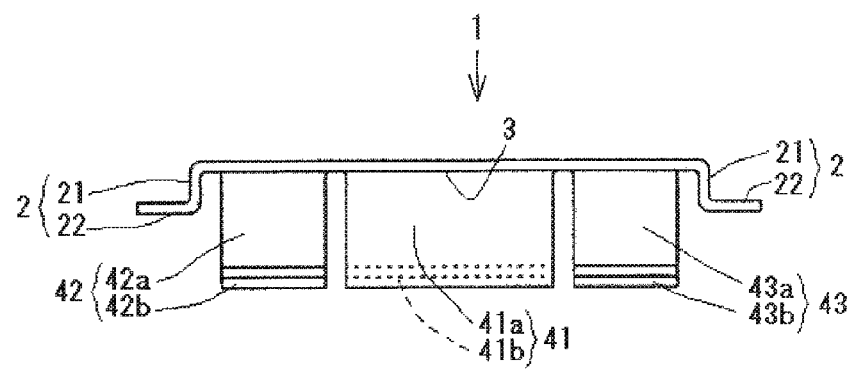
FIG. 3 is a plan view of the fixing device according to one embodiment of the present invention.

An exemplary configuration of a fixing device 1 of the present invention is illustrated in FIG. 1 to FIG. 3. An exemplary formation procedure of the fixing device is illustrated in FIGS. 4A to 4C.

The fixing device 1 defines an intermediate line C parallel to two sides 1a and 1b between the two sides 1a and 1b, which are opposed to one another, of a rectangular metal plate. In this embodiment, a part from the intermediate line C to one side 1a among the two sides 1a and 1b is formed as the main body portion 3 with for example, a nail hole 31 or similar for installation to the wall body W, which is the constructed object of an architectural structure. A slit, which is continuous with the main body portion 3 at the intermediate line C, is formed at a part from the intermediate line C to the other side 1b. Moreover, a plurality of leaf spring-shaped ship plates, which are three (3) pieces of strip plates 41 to 43 in the embodiment illustrated in the drawing, are formed orthogonal to the two sides 1a and 1b. By folding the strip plates 41 to 43, the fixing device 1 can lock fixing ends 51a and 52b (described later) of the siding board 50.

In the embodiment illustrated in the drawing, the above-described intermediate line C is disposed at the approximately intermediate position of the two sides 1a and 1b. However, insofar as the intermediate line C is disposed between the two sides 1a and 1b, the intermediate line C may be disposed off-centered toward one of the sides to form the main body portion 3 large or small compared with the embodiment illustrated in the drawing.

Figure 4A:
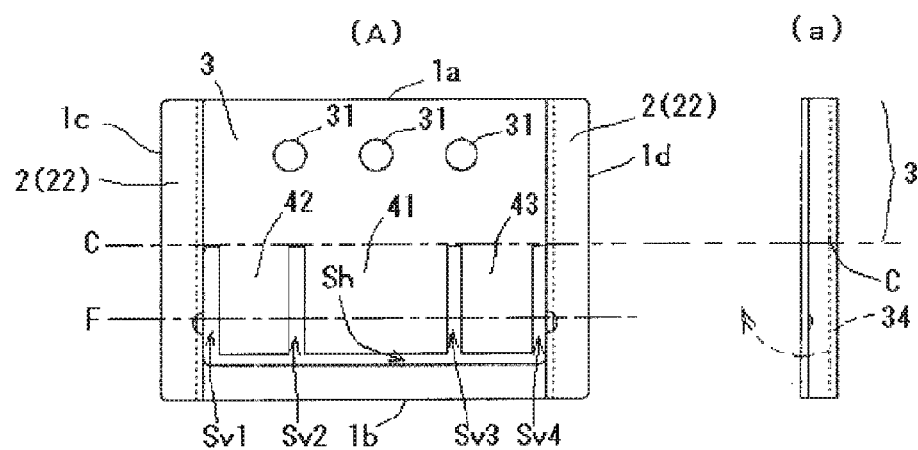
FIG. 4A to FIG. 4C are explanatory drawings illustrating an exemplary bend procedure of strip plates disposed at the fixing device.
Figure 4B:
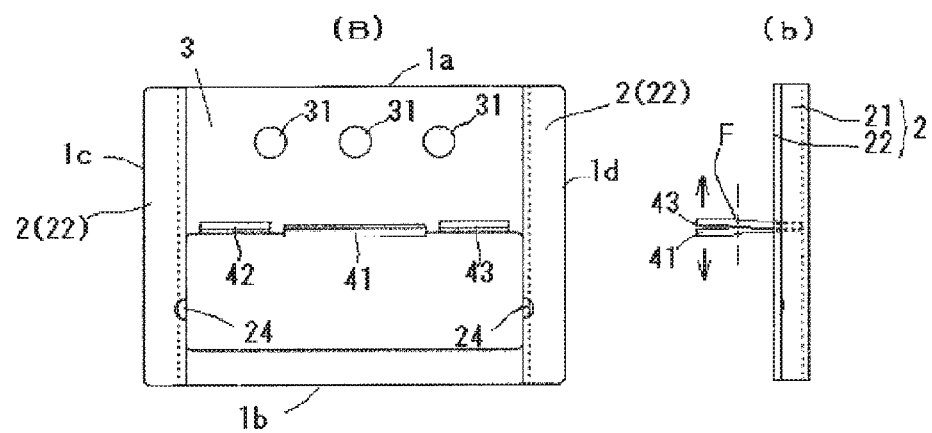
Figure 4C:
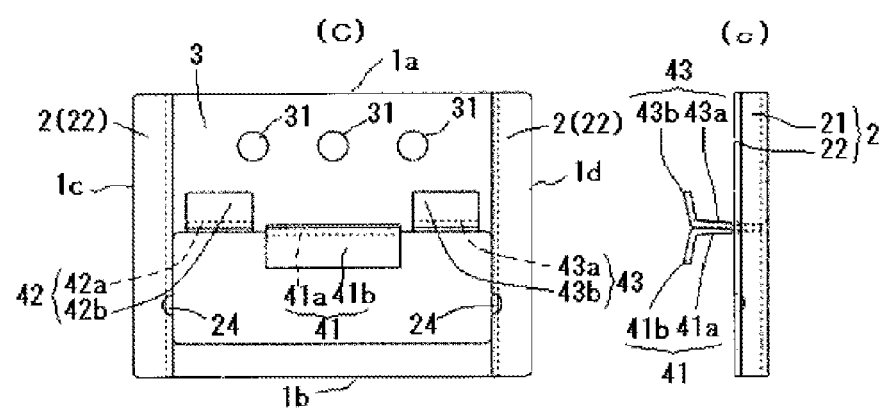

In the embodiment illustrated in the drawing, as illustrated in FIG. 4A, a slit Sh and four (4) slits Sv1 to Sv4, which form a comb-shaped slit as a whole, are formed. The slit Sh is parallel to the side 1b. The slits Sv1 to Sv4 are orthogonal to the slit Sh and formed between the slit Sh and the intermediate line C. Between the slits Sv1 to Sv4, the three pieces of the strip plates 41, 42, and 43 are formed with the slit Sh at the lower end. However, the shape of the slits is not limited to the embodiment illustrated in the drawing. Various modifications are possible while still achieving the objects of the invention. Assume a case where, for example, the slits Sv1 to Sv4 are extended to the side 1b, formation of the slit Sh is omitted, and a spacer 2 (described later) is not disposed in this configuration. Then, the sides 1c and 1d may be formed as one sides of the right and left strip plates 42 and 43 without disposing the slits Sv1 and Sv4. Further, insofar as the plurality of ship plates are disposed, the number of strip plates disposed at the fixing device 1 may be two pieces or may be equal to or more than four pieces.

The plurality of pieces of strip plates 41, 42, and 43 thus formed are bent to the same direction (the direction indicated b an arrow 34 in (a) in FIG. 4A) placing the intermediate line C as fulcrum ((A) in FIG. 4A, (B) in FIG. 4B, (a) in FIG. 4A, and (b) in FIG. 4B). At least one piece among the three pieces of strip plates 41, 42, and 43, which is the center strip plate 41 in the embodiment illustrated in the drawing, and the remaining two pieces of strip plates 42 and 43 are bent to the opposite directions (the direction indicated by an arrow in (b) in FIG. 4B) on another at a bend position parallel to and away from the intermediate line C by a predetermined distance (bend line F). The fixing pieces 41a, 42a, and 43a are formed at the part from the intermediate line C to the bend line F, and the lock pieces 41b, 42b, and 43b are formed at the part from the bend line F to the distal ends of respective strip plates 41, 42, and 43 ((B) in FIG. 4B, (C) in FIG. 4C, (b) in FIG. 4B and (c) in FIG. 4C).

Then, the fixing ends 51b and 52b (described later) of the siding board 50 are locked to the L-shaped lock portions formed by the lock pieces 41b, 42b, and 43b and the fixing pieces 41a, 42a, and 43a. Thus, the siding boards 50 can be fixed to the wall body W.

In the embodiment illustrated in the drawing, the lock piece 41b disposed at the center strip plate 41 is bent downward to lock the upper fixing end 52b of the lower siding board 50 with the center strip plate 41. Meanwhile, the lock pieces 42b and 43b disposed at the right and left strip plates 42 and 43 are bent upward to lock the lower fixing end 51b of the upper siding board 50 with the right and left strip plates 42 and 43. However, conversely, the lock pieces 42b and 43b of the right and left strip plates 42 and 43 may be bent downward to lock the upper fixing end 52b of the lower siding board 50. Meanwhile, the lock piece 41b of the center strip plate 41 may be bent upward to lock the lower fixing end 51b of the upper lower siding board 50.

The fixing piece 41a, which is disposed at the center strip plate 41, and the fixing pieces 42a and 43a, which are disposed at the right and left strip plates 42 and 43, are bent at the respective different inclined angles θ1 and θ2 (see FIG. 2B which is the enlarged view of a portion circled in FIG. 2A) with respect to the above-described main body portion 3. In the embodiment illustrated in the drawing, the inclined angle θ1 of the fixing piece 41a disposed at the center strip plate 41 is formed to slightly obtuse angle (approximately 93°) while the inclined angle θ2 of the fixing pieces 42a and 43a disposed at the right and left strip plates 42 and 43 are formed to slightly acute angle (approximately 87°). Thus, the center fixing piece 41*a* and the right and left fixing pieces 42*a* and 43*a* are formed to provide a predetermined angle difference (approximately 6 degrees in the embodiment illustrated in the drawing) between them. In view of this, in the embodiment illustrated in the drawing with each fixing piece 41*a*, 42*a*, and 43*a* of 9.69 mm, the difference in height of approximately 1 mm is generated between the distal end portion of the fixing piece 41*a* and the distal end portions of the fixing pieces 42*a* and 43*a* in the side view.

The inclined angle θ1 of the center fixing piece 41*a* and the inclined angle θ2 of the right and left fixing pieces 42*a* and 43*a* can be appropriately adjusted according to the amount of change in dimensions of the siding board 50. To fix the siding boards where the dimensional change is large, the difference between the inclined angle θ1 of the center fixing piece 41*a* and the inclined angle θ2 of the right and left fixing pieces 42*a* and 43*a* may be provided larger. Conversely, to fix the siding boards 50 where the dimensional change is small, the angle difference may be provided small.

In the example illustrated in the drawing, the inclined angle θ1 of the center fixing piece 41*a* is configured to be an obtuse angle with respect to the main body portion 3 while the inclined angle θ2 of the right and left fixing pieces 42*a* and 43*a* is configured to be an acute angle with respect to the main body portion 3. The lock end portion disposed on the upper end side of the lower siding board is fixed by being butted against the center fixing piece 41*a*. The lock end portions disposed on the lower end side of the upper siding board is fixed by being butted against the right and left fixing pieces 42*a* and 43*a*. However, conversely, the inclined angle θ1 of the center fixing piece 41*a* may be configured to be an acute angle with respect to the main body portion 3 while the inclined angle θ2 of the right and left fixing pieces 42*a* and 43*a* may be configured to be an obtuse angle with respect to the main body portion 3. The lock end portions disposed on the upper end of the lower siding board may be fixed by being butted against the right and left fixing pieces 42*a* and 43*a*. The lock end portion disposed on the lower end of the upper siding board is fixed by being butted against the center fixing piece 41*a*.

In this case, the bending direction of each lock piece 41*b*, 42*b*, and 43*b* may be as it is. However, the lock pieces 41*b*, 42*b*, and 43*b* may be bent in the upside-down direction with respect to the example illustrated in the drawing.

At the other two sides of metal plates that will become the fixing device 1, which are the two sides 1*c* and 1*d* formed in the height direction in the example illustrated in the drawing, the spacers 2 and 2 may be formed as the parts bent from the two sides 1*c* and 1*d* by the predetermined width in the same direction as illustrated in FIG. 1 to FIG. 3. The spacers 2 and 2 may restrict the space between the wall body W and the back surface of the siding board. In this embodiment, as illustrated in FIG. 3, parts near the two sides 1*c* and 1*d* in the height direction of the fixing device 1 are bent to L shape to form the spacers 2 and 2. The spacers 2 and 2 are formed of the sidewalls 21 and 21, which project forward at the predetermined length, and the flanges 22 and 22, which project outward from the sidewalls 21 and 21. The above-described three-piece strip plates 41 to 43 are formed between the two spacers 2 and 2.

The spacers 2 and 2 thus disposed allow substantially improves the bending strength of the fixing device 1 orthogonal to the two sides 1*c* and 1*d*. Installing the siding boards 50 to the wall body W using the fixing devices 1 allows providing a space (5 mm in this embodiment) corresponding to the projection length of the spacers 2 and 2 between the wall body W and the back surface of the siding board 50. As a result, even if rain water or similar object enters to the back side of the siding board 50, the entered rain water is quickly discharged via the space. Air passing through the space dries the inside of the space, a problem caused by filling of water vapor or humidity being filled, for example, generation of a mold or similar problem can be preferably prevented.

In FIG. 1, FIG. 2A, and FIGS. 4A to 4C, reference numeral 24 denotes a cutout aperture disposed at the above-described spacers 2 and 2. In the embodiment illustrated in the drawing, a through-hole is preliminary disposed at the part that becomes a boundary between the sidewall 21 and the flange 22 of metal plate. The metal plate is bent at the boundary part to form the spacer 2, thus forming semi arc-shaped cutout apertures at both the flange 22 and the sidewall 21.

In the case where the size of the fixing device 1 needs to be adjusted, for example, the fixing devices 1 of the present invention are used for fixing the lower fixing end 51*b* of the lowest siding board 50, disposing the cutout apertures 24 allows easily cutting the spacers 2 and 2 at the cutout aperture 24 positions with, for example, a tin snip, a metal saw, or similar tool.

In the configuration with the cutout apertures 24 at the spacers 2 and 2, for example, the spacers 2 and 2 can be easily cut by grabbing and bending the part near the formation position of the cutout aperture 24 with, for example, pliers. Accordingly, the size of the fixing device 1 can be easily adjusted in field work.

In the embodiment illustrated in the drawing, the cutout apertures 24 are disposed at the parts where the spacers 2 and 2 can be cut. However, the parts are not limited for the cutout apertures 24. The through-holes, for example, may be formed at the parts.

The plurality of cutout apertures 24 or through-holes may be disposed lower side of the intermediate line C in the height direction of the spacers 2 and 2, for example, with spaces equally provided. The dimensions of the fixing device 1 can also be finely adjusted by cutting the spacers 2 and 2 at any one of formation positions of the cutout apertures or the through-holes.

The fixing device 1 of the present invention thus configured is formed using an exemplary metal plate with a thickness of 1 mm. The fixing device 1 has a width of 60 mm, a height of 43 mm, a thickness of 5 mm at the spacer 2.

Usage Method

Figure 8:
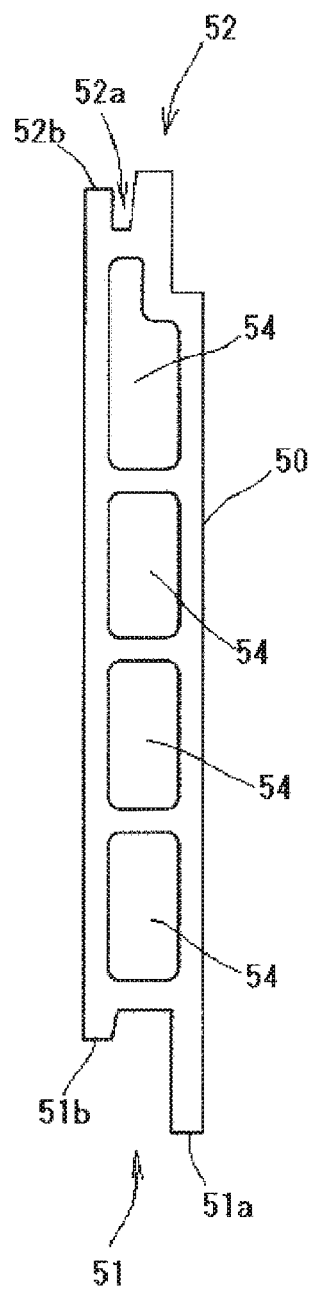
FIG. 8 is an explanatory view of the siding board (end portion in a longitudinal direction)
Figure 9:
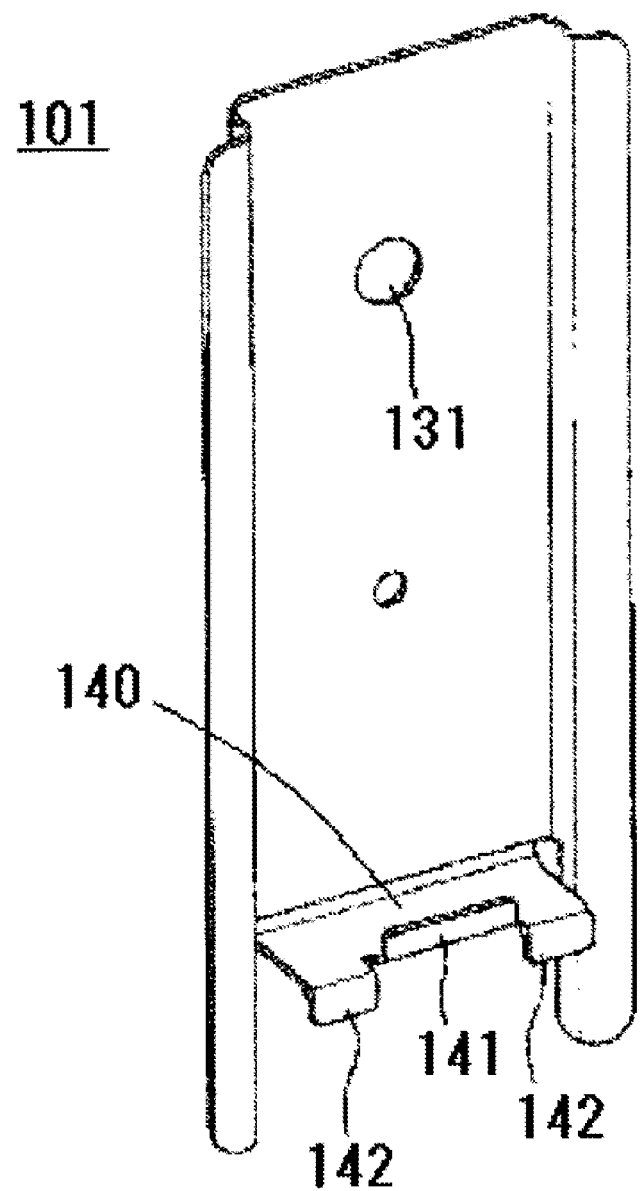
FIG. 9 is a perspective view of the conventional fixing device.

The siding boards 50 fixed with the fixing devices 1 include the fixing ends 51*b* and 52*b* on both end sides in the width direction (vertical direction) as illustrated in FIG. 8. The fixing ends 51*b* and 52*b* are locked to the strip plate 41, 42, or 43 disposed at the above-described fixing device 1.

In the embodiment illustrated in the drawing where the siding boards 50 are sequentially installed from the lower side to the upper side, when another siding board 50 is continuously disposed above the lower siding board 50, the upper fixing end 52*b* and the lower fixing end 51*b* are configured to cover an upper end portion 52 of the lower siding board 50 with a lower end portion 51 of the upper siding board 50. Accordingly, rain water or similar object flowing along the outer surface of the siding board 50 is prevented from entering the inside via a coupling portion of the siding boards 50.

In the embodiment illustrated in FIG. 8, to allow coupling in the vertical direction, the cross-sectional shape of the lower end portion 51 of the siding board 50 in the thickness direction is formed in the shape of a roughly downward-pointing square C shape. An outer surface side leg 51*a* formed at the C shape part is formed longer than an inner surface side leg 51*b*. Among them, the inner surface side leg 51*b* is formed as the lower fixing end 51b to be locked to the above-described lock pieces 42b and 43b disposed at the fixing device 1.

Figure 6:
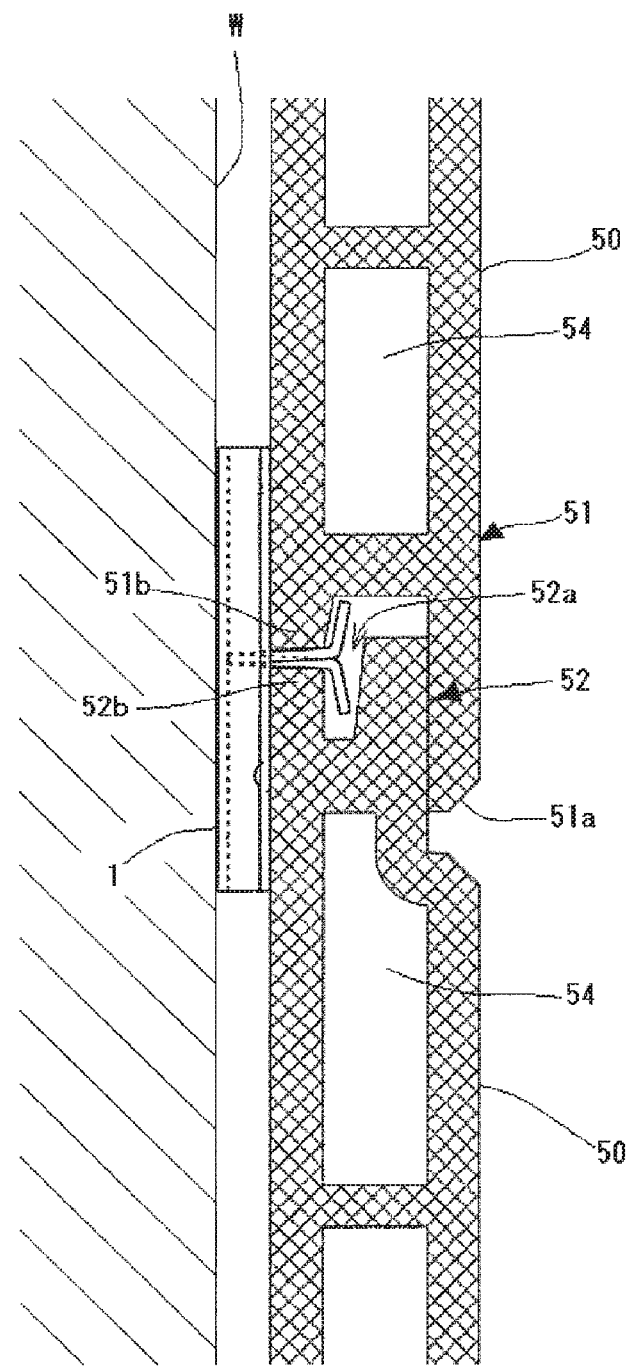
FIG. 6 is a cross-sectional view (coupling portion) of the panel (siding board) under construction.

Meanwhile, the cross-sectional shape of the upper end portion 52 of the siding board 50 in the thickness direction is notched on the outer surface side and formed to a tenon shape thinned by the amount of thickness of the outer surface side leg 51a of the lower end portion 51. The tenon part can be inserted into the space between the outer surface side leg 51a, which is disposed at the lower end portion 51 of the upper siding board 50 as illustrated in FIG. 6, and the fixing device 1. Then, a groove 52a is disposed at the tenon-shaped upper end portion 52 at the center in the thickness direction. The lock piece 41b of the center strip plate 41, which is disposed at the fixing device 1, can be inserted in the groove 52a. Accordingly, the part forming the inner surface side with respect to the groove 52a is configured as the upper fixing end 52b fixed with the fixing device 1.

The upper and lower ends of the siding board 50 are not limited to the shape illustrated in FIG. 5 to FIGS. 7A to 7C. The upper and lower ends of the siding board 50 may have the same shape as the upper and lower ends of the known siding board 150 described with reference to FIGS. 10A and 10B as an example having common basic shape.

In FIG. 5 to FIG. 8, reference numeral 54 denotes a hollow space continuously formed in the extrusion direction of the siding board 50 formed by extrusion molding in this embodiment. Forming the hollow space 54 achieves weight reduction of the siding board 50 and reduction of amount of raw material used per board, bringing cost reduction.

The exemplary siding boards 50 used in the embodiment each have a length of 2000 mm, a total width of 166 mm, a distance between the fixing ends 51b and 52b is 147 mm, and thickness of 21.25 mm. When the width direction of the siding board is assumed as the vertical direction, the siding board 50 is installed to the wall body W by being fixed with the fixing devices 1 at both ends in the width direction.

Figure 5:
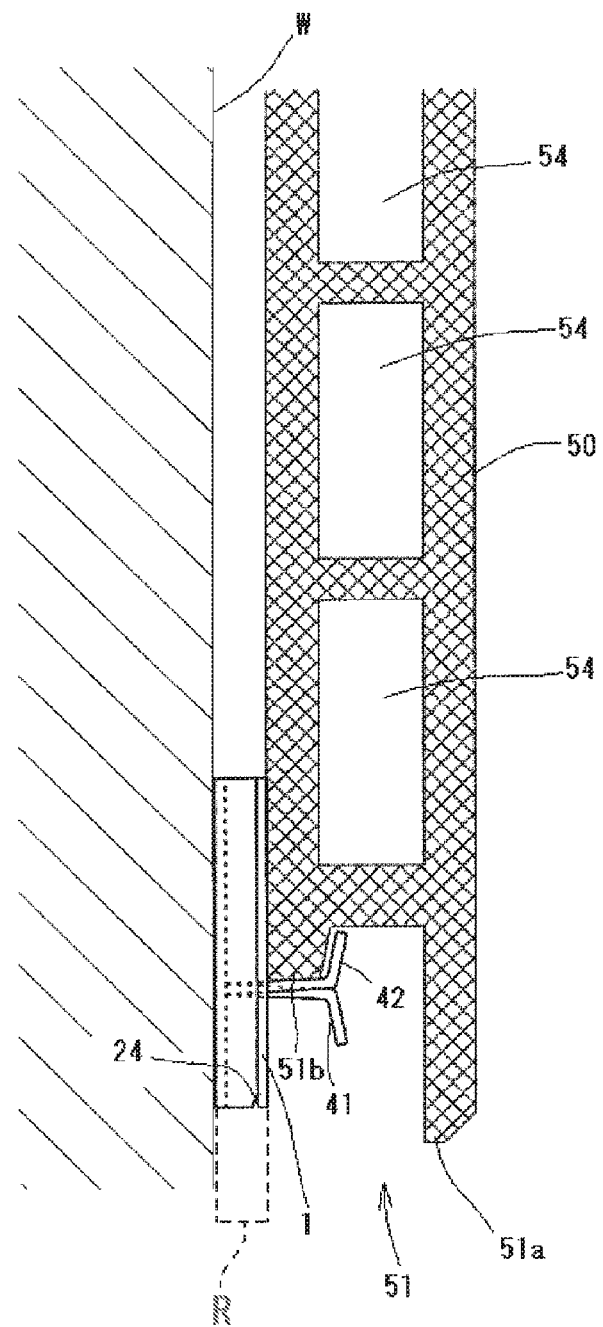
FIG. 5 is a cross-sectional view (lowest end portion) of a panel (siding board) under construction.

An exemplary construction where the siding boards 50 thus configured are installed to the wall body W using the above-described fixing devices 1 described with reference to FIG. 1 to FIGS. 4A to 4C will be described. As illustrated in FIG. 5, the fixing device 1 is fixed to the wall body W with, for example, screw nail such that the right and left fixing pieces 42a and 43a of the fixing device 1 are arranged at the installation position of the lower fixing end 51b of the lowest siding board 50.

In this respect, the lower end portion of the fixing device 1 may be cut at the formation position of the cutout apertures 24 disposed at the spacers 2 and 2. In this embodiment, by thus partially cutting the fixing device 1 (see "R" in FIG. 5 which indicates a part removed by cut), the fixing device 1 is covered with the outer surface side leg 51a disposed at the lower end portion 51 of the siding board 50 when the lower fixing end 51b of the siding board 50 is fixed to the fixing device 1 as illustrated in FIG. 5. This completely hides the fixing device 1 from an eyesight, and the siding board 50 becomes to have a good appearance.

In this embodiment, the fixing devices 1 are installed to the wall body W providing equal space of 450 mm laterally. The installation space can be appropriately changed according to, for example, the scale of the architectural structure to be constructed and the weight of the used siding board 50, though.

As described above, after the installation of the lowest fixing device 1 is completed, the lower fixing end 51b of the lowest siding board 50 is locked to the strip plates 42 and 43 disposed at the fixing device 1 and the siding board 50 is disposed parallel to the wall body W. Then, the upper fixing end 52b of the siding board 50 is locked to the center strip plate 41 disposed at the fixing device 1, and the fixing device 1 is fixed to the wall body W in this state with, for example, a screw nail.

In this embodiment, the fixing device 1 was installed with a space of 450 mm similarly to the above-described lowest fixing device 1. However, as described above, the space is variable according to for example, the weight of the siding board 50 to be installed and the scale of the architectural structure.

As described above, fixing the upper fixing ends 52b of the siding boards 50 with the fixing devices 1 allows fixing both of the upper and lower ends of the siding boards 50 with the fixing devices 1 and installing the siding boards 50 on the wall body W.

The right and left strip plates 42 and 43, which are disposed at the fixing device 1 that fixes the upper fixing end 52b of the siding board 50, can further lock the lower fixing end 51b of another siding board 50. Placing the lower fixing end 51b of the second-stage siding board 50 to the right and left strip plates 42 and 43 disposed at the second-stage fixing device 1 allows stacking another (second stage) siding board 50 on the first-stage siding board 50.

Further, the upper end portion 52 of the second-stage siding board 50 is fixed with another fixing device 1. Repeating this work allows installing the siding boards 50 to the wall body W up to required height.

Figure 10A:
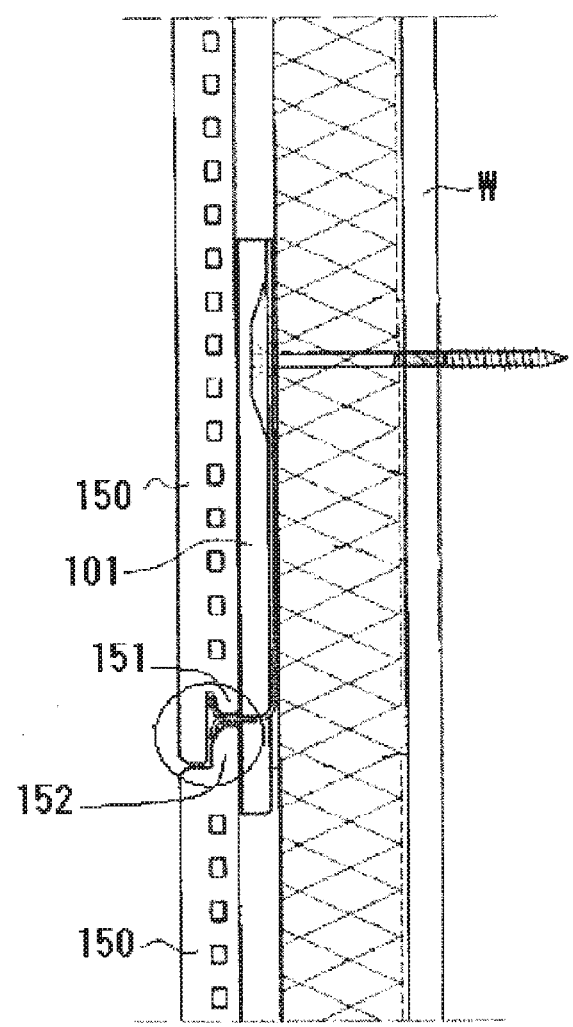
FIG. 10A is an explanatory view where the siding boards are fixed with the conventional fixing device.
Figure 10B:
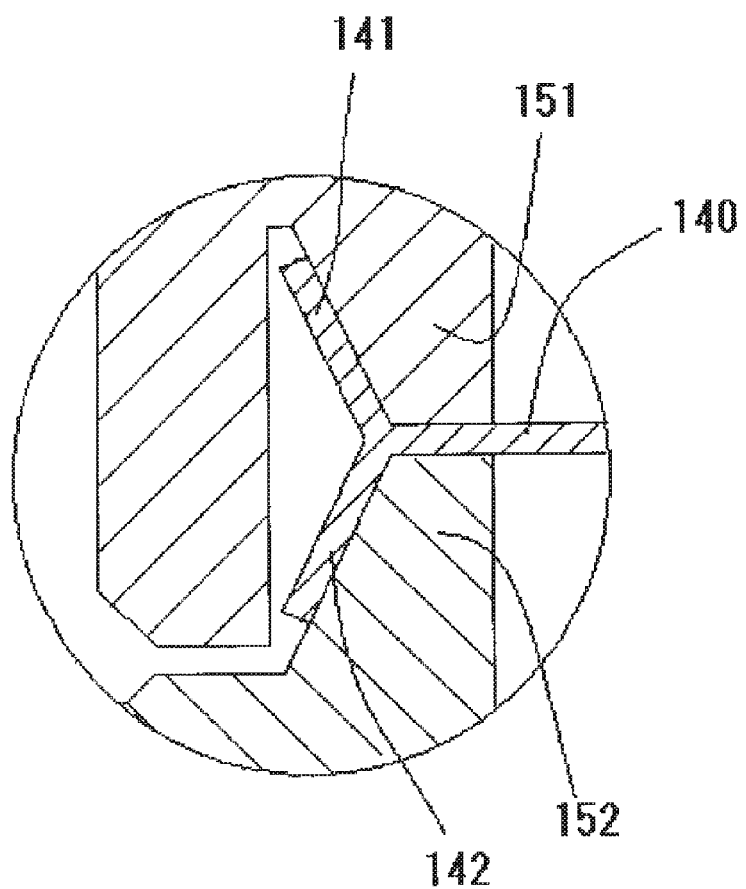
FIG. 10B is an enlarged view of a portion circled in FIG. 10A.
Figure 11A:
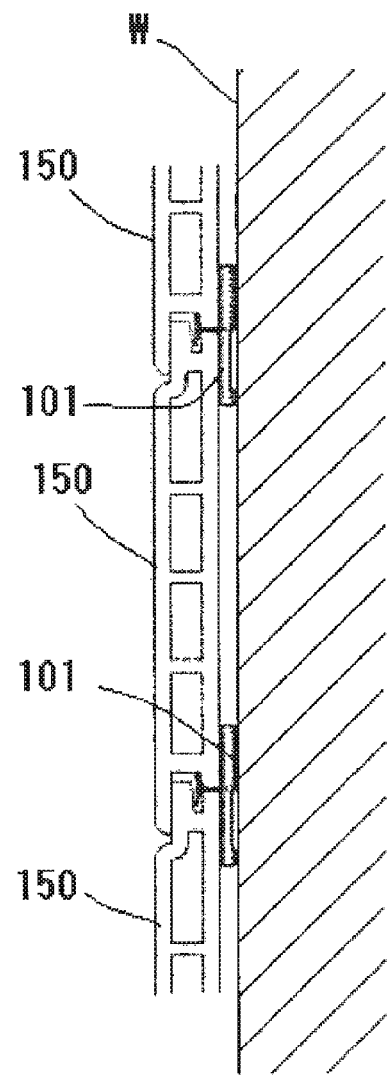
FIG. 11A is an explanatory view illustrating a state where expansion of the siding board is not generated.
Figure 11B:
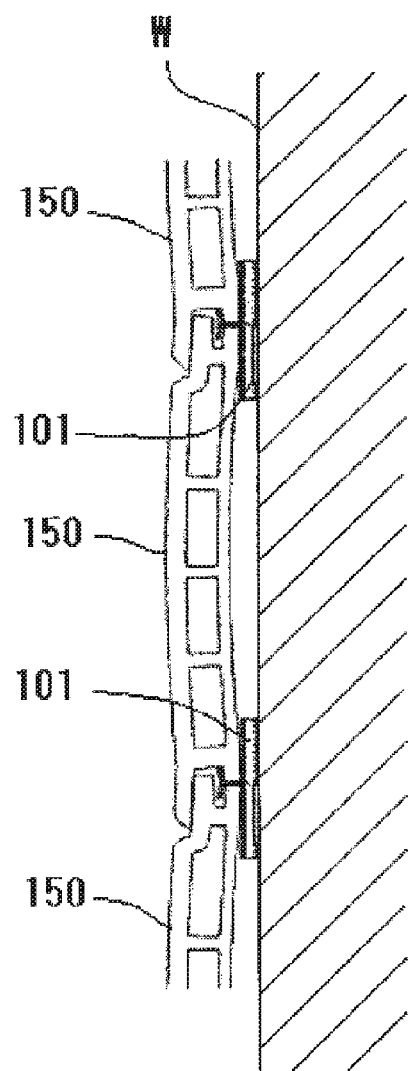
FIG. 11B is an explanatory view illustrating state where warping occurs together with expansion.

As described above, the siding boards 50, which are installed to the wall body W using the fixing devices 1 of the present invention, are similar to the configuration of the related art described with reference to FIGS. 10A and 10B in that the upper fixing end 52b of the lower siding board 50 and the lower fixing end 51b of the upper siding board 50 are vertically disposed via the fixing pieces 41a, 42a, and 43a disposed at the strip plates 41 to 43 as illustrated in FIG. 6 and FIGS. 7A to 7C.

However, both the upper fixing end 152 of the lower siding board 150 and the lower fixing end 151 of the upper siding board 150 have the conventional configuration (see FIGS. 10A and 10B) where both are butted against the single fixing piece 140. The fixing device 1 of the present invention fixes the position of the siding boards 50 by butting the upper fixing end 52b of the lower siding board 50 to the fixing piece 41a disposed at the center strip plate 41, and the lower fixing end 51b of the upper siding board 50 to the fixing pieces 42a and 43a disposed at the right and left strip plates 42 and 43. Additionally, the inclined angle θ1 of the center fixing piece 41a with respect to the main body portion 3 and the inclined angle θ2 of the right and left fixing pieces 42a and 43a are formed to be mutually different angle. Accordingly, between the upper fixing end 52b of the lower siding board 50 and the lower fixing end 51b of the upper siding board 50, a space equal to or more than the thickness (1 mm) of the metal plate constituting the fixing device 1 (2 mm in the embodiment illustrated in the drawing) is formed.

Figure 7A:
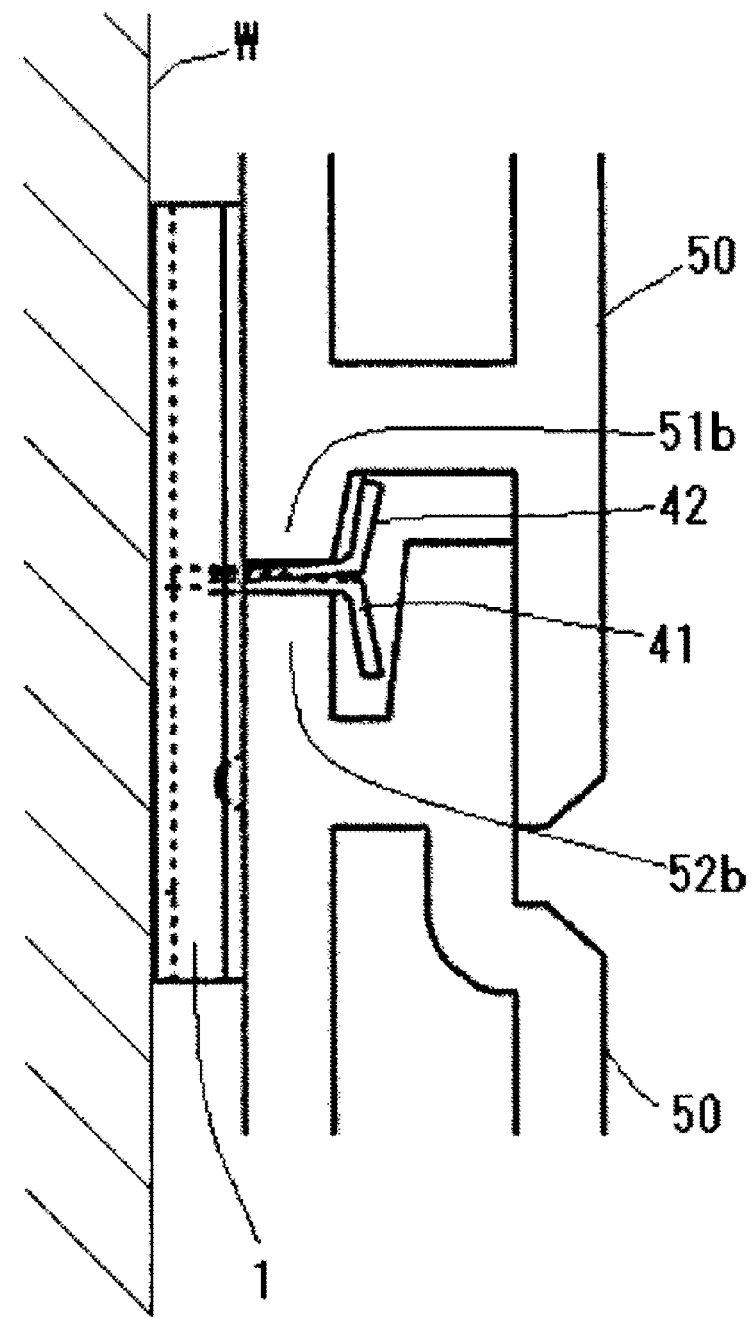
FIG. 7A to FIG. 7C are explanatory views illustrating a state of deformation of the fixing device in accordance with expansion of the siding board.
Figure 7B:
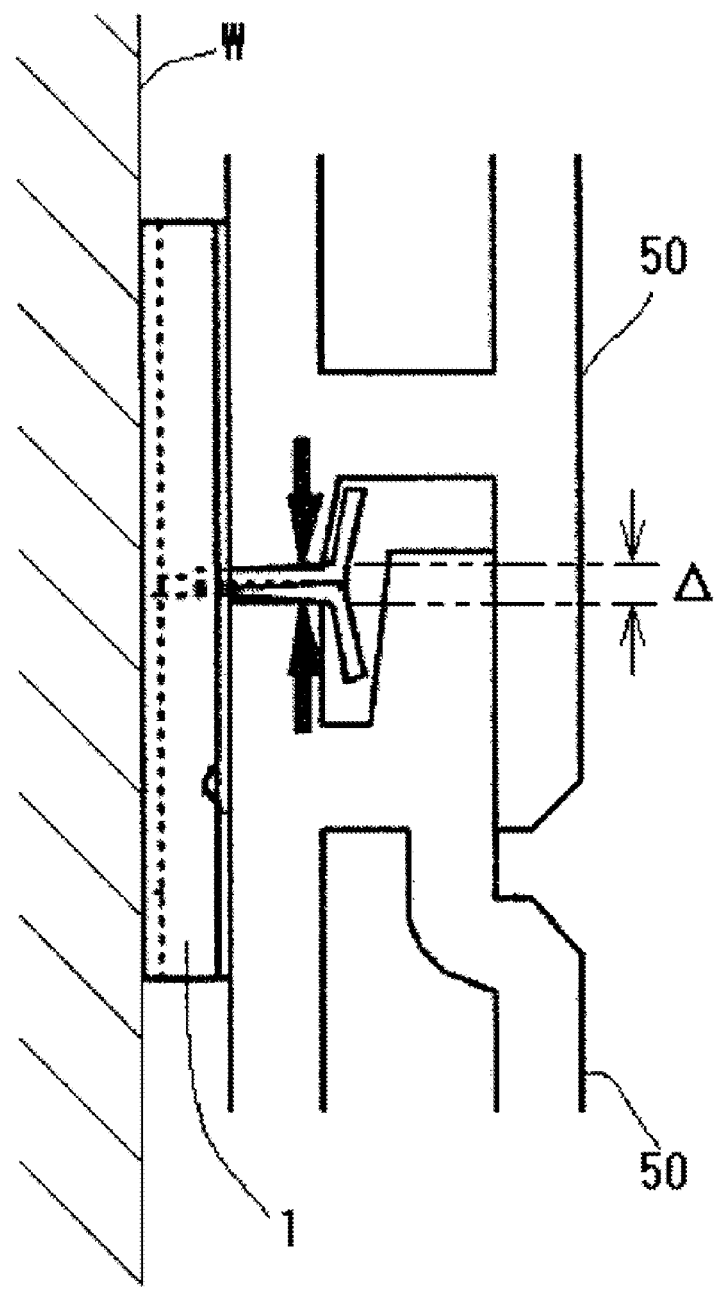
Figure 7C:
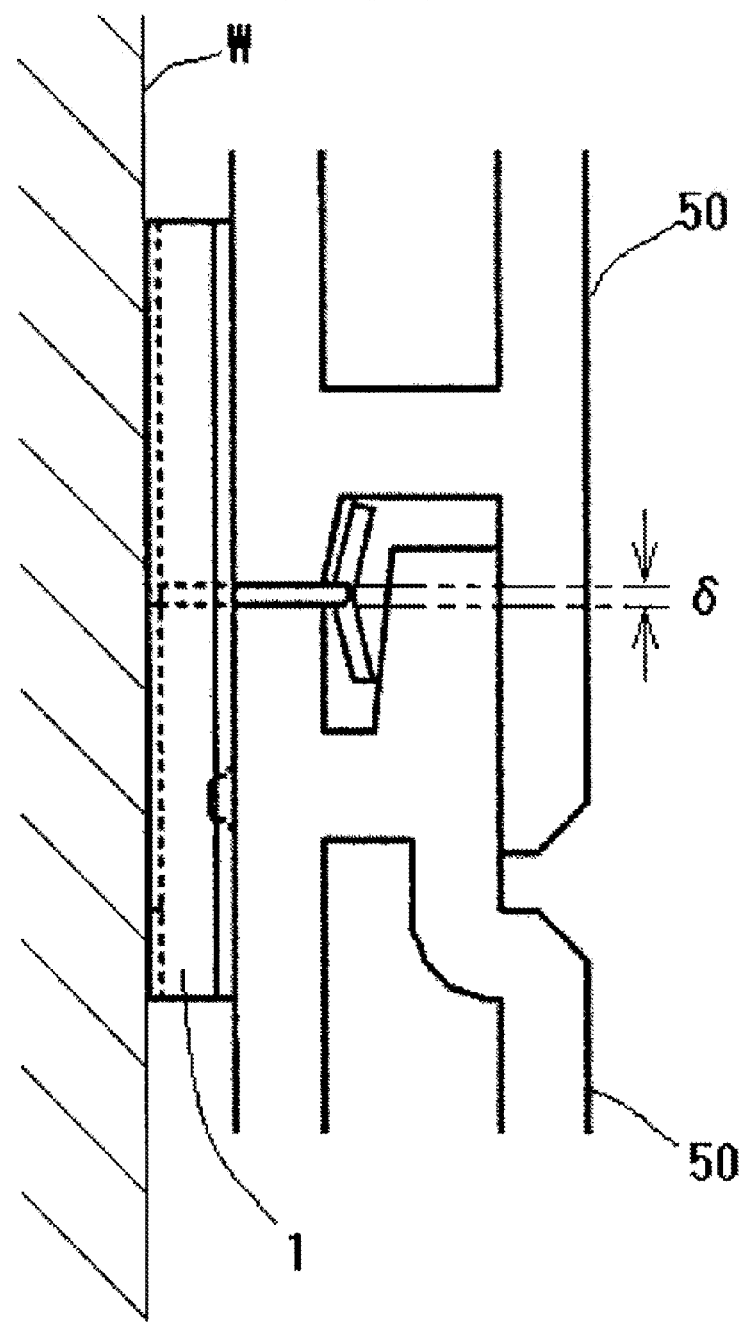

As a result, in the mounting state illustrated in FIG. 7A and FIG. 7B, a space between the upper fixing end 52b of the lower siding board 50 and the lower fixing end 51b of the upper siding board 50 was a space Δ. However, even if the space Δ is narrowed to a space δ by expansion of the siding board 50 due to temperature rise as illustrated in FIG. 7C, this increase in dimension due to expansion of the siding board can be absorbed as long as the amount of reduction in the space (Δ−δ) is in a movable range of the fixing pieces 41a, 42a, and 43a due to elastic deformation, that is, in the range of the difference between the space Δ and the board thickness (Δ−1 mm in this embodiment).

In the embodiment illustrated in the drawing, in the side view illustrated in FIG. 2, the top surface of the distal end portion of the center fixing piece 41a and the inferior surface of the distal end portion of the right and left fixing pieces 42a and 43a are at the same position in height. Accordingly, between the upper fixing end 52b of the lower siding board 50 and the lower fixing end 51b of the upper siding board 50, the space (Δ=2 mm) twice the board thickness (1 mm) is formed to absorb the dimensional change up to 1 mm of thermal expansion of each siding board.

Given that larger-dimensioned siding boards 50 to be fixed with the fixing devices 1 of the present invention will naturally mean larger dimensional changes due to swelling, in this embodiment, the above-described dimensional absorption range is set to 1 mm. However, to fix the larger siding boards 50, the absorption range of equal to or more than 1 mm may be provided by, for example, further increasing the difference between the inclined angle θ1 of the center fixing piece 41a and the inclined angle θ2 of the right and left fixing pieces 42a and 43a. On the other hand, to fix compact siding boards, the absorption range may be set small by, for example, reducing the difference between the inclined angles θ1 and θ2.

(Setting Absorption Width)

A siding board made of synthetic wood, which easily generates dimensional change due to thermal expansion compared with the cement-based and metal-based siding boards, was disposed outdoor for two (2) years and four (4) months, and then the dimensional change in the distance between the upper and lower fixing portions (147 mm at the time of manufacture) was measured. The results are listed in Table 1.

TABLE 1

Dimensional Change Of Siding Board Made Of Synthetic Wood

| Year/Month Measured | Elapsed Time (month) | Dimensions (mm) | Expansion (mm) | Rate Of Change |
|---|---|---|---|---|
| 2008/June | 0 | 147.00 | 0.00 | 0.00% |
| 2008/July | 1 | 147.28 | 0.28 | 0.19% |
| 2008/September | 3 | 147.39 | 0.39 | 0.26% |
| 2008/November | 5 | 147.27 | 0.27 | 0.18% |
| 2009/January | 7 | 147.24 | 0.24 | 0.16% |
| 2009/April | 10 | 147.26 | 0.46 | 0.31% |
| 2009/May | 11 | 147.41 | 0.41 | 0.28% |
| 2009/November | 17 | 147.61 | 0.61 | 0.41% |
| 2009/December | 18 | 147.63 | 0.63 | 0.43% |
| 2010/March | 21 | 147.65 | 0.65 | 0.44% |
| 2010/June | 24 | 147.77 | 0.77 | 0.52% |
| 2010/July | 25 | 147.88 | 0.88 | 0.60% |
| 2010/August | 26 | 147.83 | 0.83 | 0.57% |
| 2010/September | 27 | 147.77 | 0.77 | 0.52% |
| 2010/October | 28 | 147.71 | 0.71 | 0.48% |

As described above, in the siding board made of synthetic wood with large dimensional change, the dimensional change is approximately 0.6% at maximum. The absorption range of the dimensions is provided approximately 0.7% (approximately 1 mm in the embodiment illustrated in the drawing where the distance between the fixing ends is 147 mm) with respect to the distance between the upper and lower fixing ends of each siding board to be fixed. This preferably absorbs the dimensional change in the siding board made of synthetic wood. Thereby, with the fixing device of the present invention, regardless of the material of the siding board, the siding boards made of any material can be fixed with always preferable state by absorbing the dimensional change in accordance with, for example, change in the temperature.

Accordingly, the scope of the following claims is not limited to the equipment, apparatus, machine, or device configured only by specific means disclosed here, or to the steps or method disclosed here. The aforementioned scope of the claims is intended to protect the core or essence of this innovative invention. The present invention apparently has novelty and is practical.

Furthermore, at the time of conception of the present invention, the present invention was not obvious to those skilled in the art in view of the related art or is apparently a pioneering invention within the technical field in view of the revolutionary characteristics of the invention. In legal terms, the scope of the following claims must be interpreted in an extremely broad way to protect the core of the invention.

Therefore, since the aforementioned objects clarified in the above description are efficiently achieved, and the above configuration permits modifications to some degree without departing from the scope of the invention, all of the contents included in the above description and the appended drawings should be interpreted in an exemplary manner but not in a limited manner. It is to be understood that the scope of the following claims should include all the comprehensive and inherent characteristics of the invention described here, and in linguistic aspects, all other expressions in the scope of the invention belong to the scope of the claims.

DESCRIPTIONS OF REFERENCE NUMERALS

1 Fixing device
1a, 1b, 1c, 1d Sides
2 Spacer
   21 Sidewall
   22 Flange
   24 Cutout aperture
3 Main body portion
31 Nail hole
41 Strip plate (Center)
41a Fixing piece (Center)
41b Lock pieces
42, 43 Strip plates (Left and Right)
42a, 43a Fixing pieces (Left and Right)
42b, 43b Lock pieces (Left and Right)
50 Panel (Siding board)
51 Lower end portion
51a Outer surface side leg
51b Inner surface side leg (Lower fixing end)
52 Upper end portion
52a Groove
52b Upper fixing end
54 Hollow space
101 Fixing device
131 Nail hole
140 Fixing piece
141,142 Lock pieces
150 Siding board
151 Lower fixing end
152 Upper fixing end
C Intermediate line
Bend line
Wall body (Constructed object)
θ1 Inclined angle of the central fixing piece 41a)
θ2 Inclined angle (of the left and right fixing pieces 42a, and 43a)

The invention claimed is:

1. A fixing device for a panel, comprising:
a rectangular metal plate with opposed two sides,
an intermediate line being defined parallel to the two sides between the two sides,
a main body portion being formed an area from the intermediate line to one side of the two sides,
a slit being formed at an area from the intermediate line to the other side among the two sides, a plurality of pieces of leaf spring-shaped strip plates being formed continuous with the main body portion at the intermediate line, the plurality of pieces of leaf spring-shaped strip plates being formed orthogonal to the two sides; and a nail hole disposed at the main body portion for fixing to a wall body, wherein all the strip plates are bent at the intermediate line to a same direction with respect to the main body portion, at least one of the plurality of pieces of the strip plates is bent to a predetermined direction at a bend position parallel to and away from the intermediate line at a predetermined distance, remaining strip plates excepting the strip plate bent to the predetermined direction among the plurality of pieces of the strip plates are bent at the bend position to a direction opposite from the predetermined direction, areas from the intermediate line of each strip plate to the bend position are fixing pieces, areas from the bend position to a distal end are lock pieces, and a first inclined angle of the fixing piece disposed at the strip plate on which the lock piece is bent to a predetermined direction is formed to have a different angle from a second inclined angle of the fixing pieces disposed at the remaining strip plates, and when the panel is expanded, each of the fixing pieces is elastically deformed to an extent that the first inclined angle and the second inclined angle become the same angle.

2. The fixing device for a panel according to claim 1, wherein the panel is a siding board made of synthetic wood, and the fixing device is used for fixing both end portions in an orthogonal direction to a longitudinal direction of the siding board.

3. The fixing device for a panel according to claim 2, wherein spacers are formed by bending along other two sides orthogonal to the two sides of the metal plate at a predetermined width and in a same direction, and three pieces of the strip plates are formed between the spacers.

4. The fixing device for a panel according to claim 3, wherein the spacers include sidewalls and flanges, the sidewalls being orthogonal to the main body portion, the flanges projecting outward from the sidewalls and being parallel to the main body portion.

5. The fixing device for a panel according to claim 4, wherein a cutout aperture or a through-hole is disposed on each of the spacers outside of the main body portion.

6. The fixing device for a panel according to claim 3, wherein a cutout aperture or a through-hole is disposed on each of the spacers outside of the main body portion.

7. The fixing device for a panel according to claim 1, wherein spacers are formed by bending along other two sides orthogonal to the two sides of the metal plate at a predetermined width and in a same direction, and three pieces of the strip plates are formed between the spacers.

8. The fixing device for a panel according to claim 7, wherein the spacers include sidewalls and flanges, the sidewalls being orthogonal to the main body portion, the flanges projecting outward from the sidewalls and being parallel to the main body portion.

9. The fixing device for a panel according to claim 8, wherein a cutout aperture or a through-hole is disposed on each of the spacers outside of the main body portion.

10. The fixing device for a panel according to claim 8, wherein a cutout aperture or a through-hole is disposed on each of the spacers outside of the main body portion.

* * * * *